Nov. 16, 1965 R. H. WAITMAN ETAL 3,218,442

INFORMATION RECORDING DEVICE

Filed March 16, 1961

INVENTORS
REUBEN H. WAITMAN
ANNE T. FESPERMAN
CHARLES C. BEAZLEY
BY
Frederick F. Mock, Michael J. Quillinan and Walter D. Ames
ATTORNEYS

United States Patent Office 3,218,442
Patented Nov. 16, 1965

3,218,442
INFORMATION RECORDING DEVICE
Reuben H. Waitman, Pearl River, N.Y., Anne T. Fesperman, Charlottesville, Va., and Charles C. Beazley, Battle Creek, Mich., assignors to General Foods Corporation, White Plains, N.Y., a corporation of Delaware
Filed Mar. 16, 1961, Ser. No. 96,198
11 Claims. (Cl. 235—61.12)

This application relates to a device for recording information. More particularly it concerns such a device which includes a punch card upon which information is recorded by the creation of definitely located apertures in the card, which is then read or stored subject to later retrieval and reading of the information recorded thereon.

Punch card systems for storing data are in wide use throughout a large variety of industries. This use is found to be particularly advantageous where many different items of information are to be recorded in such a manner that a search can later be made in a relatively short period of time to retrieve information noted by means of punched out portions on one or more cards, thereby selected from a very large number of cards.

A major handicap to the use of punch cards, however, has been the difficulty in achieving a clean punch by manual means so that the portion of the card which is to be severed from the remainder of the card by means of a punching member will be completely and uniformly removed from its original position as part of the card. Since portions to be punched from a card are normally attached to the card by cut or score lines before a punching operation has taken place, the precision with which the cut or score lines are formed is one element which is determinative of the success achieved when a punch member is applied to the face of the portion to be removed.

Retention of the removable portions of the card which have not been punched out must be assured, and so the removable portions are conventionally most firmly attached to the rest of the card at the corners thereof. Such attachment is achieved by providing score lines which approach one another but do not actually meet and are separated by small amounts of fibrous, cellulosic material from which the card is formed. These tufts of material are disjointed from the card body or the removable portion as the punch member presses against the portion and enters the aperture formerly occupied by the punched out portion. However, where the punch member has not been applied in the center of the portion to be removed, the force applied along the periphery of that portion will not be uniform and there will be a tendency for the punched out portion to be severed only partially or incompletely. This results in the punched out portions remaining attached to the body of the punch card even when the punch member has been fully inserted to its maximum punching position. Consequently, it is a common occurrence for incompletely severed portions either to be pulled back into the apertures created upon their exit when the punch member is withdrawn from the aperture, or later to be deposited in that aperture upon subsequent movement of the cards.

When a partially punched out portion becomes inserted in its aperture so that it fully or partially blocks the aperture, there is a likelihood that, upon subsequent attempted retrieval of the information recorded on the card, the information will not be retrieved at all due to false sensing by the sensing means of a business machine. Partially punched out portions require careful editing of the punch cards, and such editing, i.e., complete hand removal of partially punched out portions, is time consuming and defeats one of the prime attributes of the punch card system, namely, speed of information retrieval. Means are presently commercially available to ensure that the punched out portion will be completely severed from its card and that the aperture created by the removal of the punched out portion will be unobstructed when stored. Nevertheless, such means are relatively expensive in known forms, and since punch cards which are to be distributed to a wide number of persons in order to conduct a survey, for example, are distributed in large quantities, it is economically unfeasible to use such expensive devices. Thus, because those who utilize the punch card do not exercise extreme card in punching out the portions to be removed, it is a common occurrence for punched out portions to obstruct or be in a position capable of obstructing their apertures.

It is, therefore, a primary object of the present invention to provide a device for recording information which utilizes a punch card as a part thereof and which ensures complete removal of a punched out portion from the card at a cost far less than other commercially available means.

It is another object of the present invention to provide a device for recording information in which that part of the device which ensures complete removal of a punched out portion from the card is so inexpensive that it may be discarded after information has been recorded on the card, and is therefore highly advantageous for use where there is to be a wide distribution of devices.

It is still another object of the present invention to provide a device for recording information which performs the further function of holding and retaining punched out portions of the card after such portions have been severed. The punched out portions are retained at a location at which they will be prevented from returning to the apertures created by their removal, yet at which they will be prevented from falling from the device to the floor, clothing of the user, or other undesirable locations.

An information recording device according to the present invention comprises at least two plies of material. One or more front plies, which are preferably conventional punch cards suitable for use in information retrieval apparatus, overlie a rear ply, which is formed from a sheet of flexible material. The rear ply is disposed in back of the front ply with respect to the intended direction of applied force against the face of the front ply at a removable portion thereof. The rear ply includes means comprising two cut lines which meet or intersect each other and underlie the removable portions of the front ply, such means engaging the removable portions as they are forced in the direction of the rear ply to hold these portions and prevent them from blocking the apertures formed in the front ply by their removal.

In accordance with a preferred embodiment of the invention, the rear ply, which may be formed from the same paperboard stock as the front ply or punch card, is formed with cut portions which underlie and are within the outline of the removable portions of the front ply. These cut portions advantageously include at least two cut lines which meet or intersect one another and are substantially extensive with the outline of the removable portions in at least one direction. The form of the cut lines is an important feature of the present invention, certain configurations having been found much more effective in grasping the removable portions of the front ply as those portions are forced in the direction of the rear ply by means of a punching instrument or the like. Thus, it has been found that configurations in the rear ply which under deformation form elements in the shape of fingers are best adapted to retain removable portions of the ply. The rear ply fingers produced by the deformation serve to retain removable portions forced and wedged between them so that when the punching instrument is withdrawn, the removable portions will be held by the fingers and will not return to their original positions in the front ply. The removable portions will then either remain grasped by the fingers of the rear ply cut portions or will fall through those cut portions. Among those cut score configurations which have been found to be most desirable are the letters H and X, and the symbol +, although other configurations will also prove suitable in use. In all such configurations, however, it is essential that at least one of the cut scores of the rear ply extend substantially across the outline of the removable portion of the front ply so that their terminal points extend at least to the perimeter of the removable portion. Preferably all of the cut score lines will be of such length as to extend across the perimeter of the perforations in the front ply. Thus, in the case of an X configuration the cut scores will intersect one another and each preferably terminates at points beyond or at least underlying corners of the removable portions of the front ply. In the case of an H configuration, here also the terminal points of the cut score are located beyond the outline of the removable portions of the front ply.

In a modified form of the present invention an additional ply is utilized in conjunction with the front and rear plies described hereinbefore. This additional or base ply is located in back of and adjacent to the rear ply. The base ply serves to retain removable portions of the front ply which have been forced through cut portions of the rear ply. One form which may be utilized to produce the base ply is that of a corrugated member fixed to the bottom surface of the rear ply at the crests of the corrugations. As the removable portions of the front ply are arranged in parallel rows, the base ply can be formed of such dimensions that the distance between corresponding points on adjacent corrugations is substantially equal to the distance between corresponding points on adjacent rows of removable portions. In this way the corrugated material can be applied to the rear ply so that the troughs of the corrugated base ply, the cut portions of the rear ply, and the removable portions of the front ply are all in registration and the troughs retain removable portions forced through the rear ply.

One highly advantageous manner in which the information recording device described herein can be used is in conjunction with means carrying visual indicia. Such means may, for example, comprise a booklet having a plurality of sheets of paper or the like. A multiplicity of such sheets or members, each carrying indicia on its face, are disposed so that each member overlies its next successive member and has a dimension, commonly a length, greater than the corresponding dimension of the that next successive member therebeneath. Thus, if the members are in the form of sheets of a booklet, the uppermost indicia-carrying sheet will be the longest and each successive underlying sheet will be shorter than the sheet which overlies it. When the sheets or members are fixed with relation to each other and the information recording device so that the sheets overlie the top ply or card of the recording device, successive areas on the face of the front ply are exposed as each member of sheet is displaced to expose its underlying member. In this manner, it will be apparent that each sheet may carry its own set of questions which can be answered by punching or marking successively exposed areas on the face of the information recording device. It will also be apparent, however, that it is not necessary that the information recording device be modified by means of a punching instrument, but that markings may be made thereon by means of a pen, pencil, or other writing instrument. The markings on the modifiable areas of the recording means can then be read visually, by light sensitive means, by electrically operated sensing means, etc.

Notwithstanding, the wide range of means which may be utilized to modify the face of the information recording means, it has been found most highly desirable to utilize the multiple-ply punch card device, which is also a part of this invention, in conjunction with the plurality of indicia bearing members. This combination produces a unitary questionnaire device in which successive sheets may be displaced to expose simultaneously successive punch card areas in which the answers to the questions may be indicated by an appropriate punching instrument. After the punch card has been completely utilized, the punch card or front ply can be separated from the remainder of the questionnaire device and mailed or otherwise directed to an information reading or storage and retrieval apparatus. This procedure may be compared on a time basis with a presently utilized method in which the answers to a multiplicity of questions are written in longhand on a sheet of paper, and the answers then transferred to a suitable card by a key-punch operator. Since the rear ply of the information recording means may be formed from paperboard, and the optional base ply made of corrugated paper, the rear and base plies as well as the booklet may be discarded by the user without undue economic loss. In this manner it will be seen that questionnaires may be mailed to a large number of persons and the answers to the questions contained therein retrieved and read or stored with simplicity, speed and resulting economy of operation not heretofore available.

These and other objects, features, and advantages of the present invention will be more readily understood when considered in connection with the illustration of a preferred embodiment of the invention in the accompanying drawing, which forms a part hereof, and in which.

Figure 4:
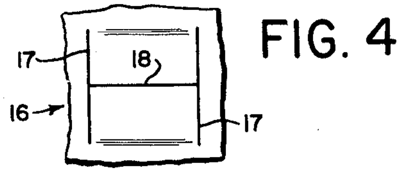
Figures 5, 6:
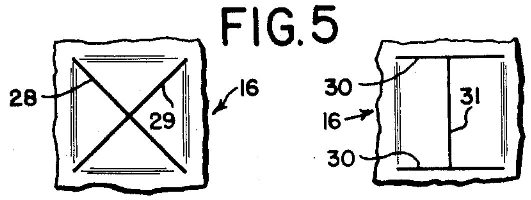

FIGS. 4, 5, and 6, are enlarged top plan views of alternative cut line configurations which may be formed in the rear ply of the information recording device.

Figure 1:
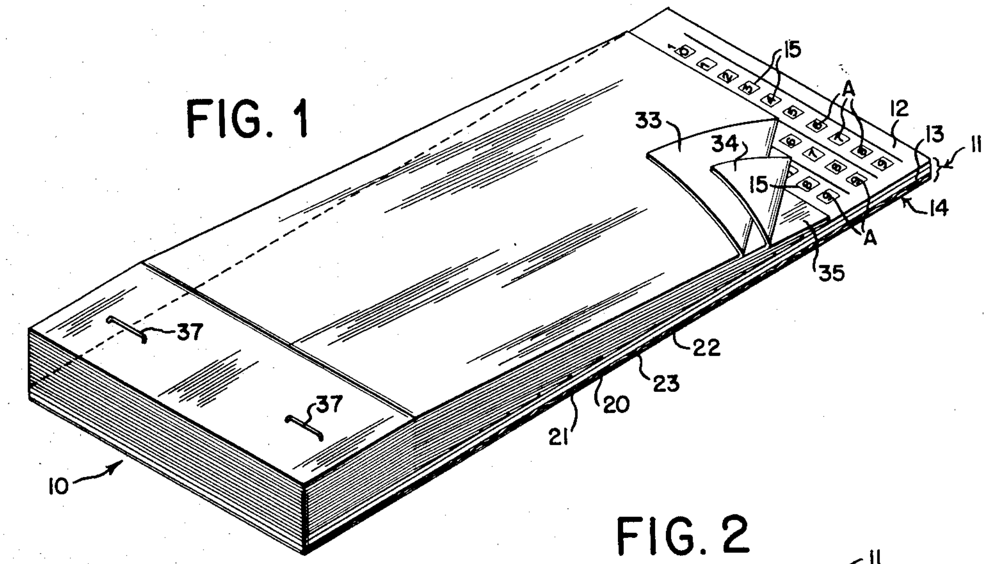
FIG. 1 is a perspective view of a unit comprising indicia bearing members and an information recording device.

Referring now to the drawing, and in particular to FIG. 1 thereof, the entire assembly of indicia bearing members and information recording device is designated by the reference numeral 10. The indicia bearing members are illustrated in the form of paper sheets equal in number to the number of columns of the punch card which is part of the information recording device designated by reference numeral 11.

Figure 2:
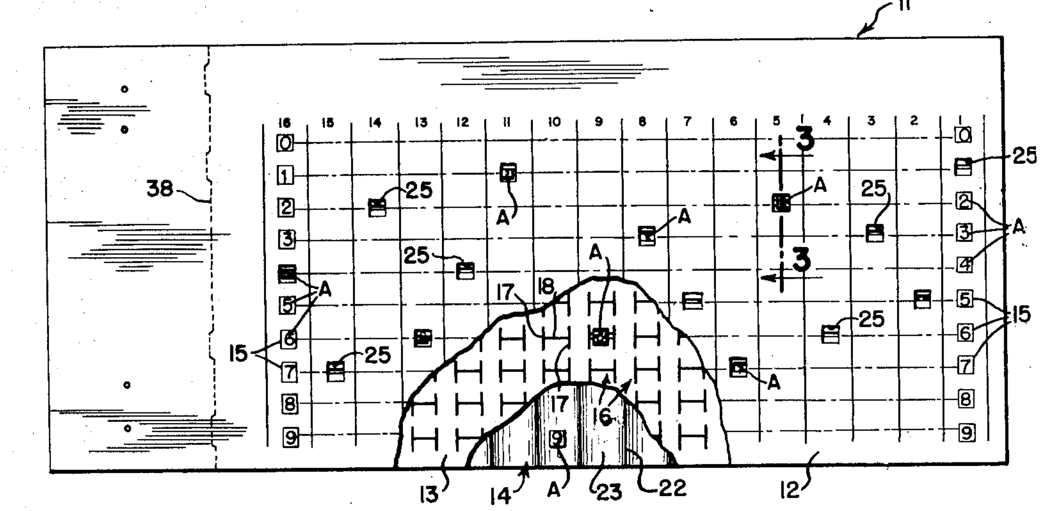
FIG. 2 is a top plan view of the information recording device illustrated in FIG. 1, the indicia bearing members having been removed.

As best seen in FIG. 2, the information recording device 11 consists of three plies of material. The uppermost ply 12 is in the form of a punch card formed from card stock and having printed on its face a plurality of columns of numbers. Underlying punch card 12 is a rear ply 13 which, in the preferred embodiment illustrated, is also formed from card stock. Underlying rear ply 13 is a base ply 14 formed from corrugated paper. As illustrated, a series of 16 columns, each of which is divided into ten parts, have been printed or otherwise indicated on the face of the front ply 12. While each of the numbers 1 through 9 have only been illustrated in columns 1 and 16 of the front ply 12 as seen in FIG. 2, it will be understood that these numbers are, in actual practice, printed in each of the columns on the face of that ply. Each of numbers 0 to 9 in each of columns 1 to 16 indicates a removable portion A, which is bounded by cut lines 15 which meet one another and form a rectangle. Consequently, when pressure is applied against the face of front ply 12 at a removable portion A, that portion will be forced from the front ply 12, the portion A being disengaged from front ply 12 along the cut lines 15 bounding the portion A. Since cut lines 15 extend through the depth of the front ply 12, the ply is severely weakened at the cut lines and a removable portion A will be forced from its position as part of the front ply 12 with little difficulty. As seen in FIG. 2, several removable portions A are illustrated in punched out positions in columns 1 to 16 of the ply 12.

Immediately adjacent to and underlying front ply 12 is rear ply 13. Rear ply 13 is so positioned that cut portions 16 of rear ply 13 are in registration with and underlie a corresponding removable portion A of the overlying front ply 12. Because cut portions 16 are formed from two cut lines, vertical cut lines 17 and horizontal cut line 18, these cut lines form an H, which is illustrated on an enlarged scale in FIG. 4.

A base ply 14 underlies rear ply 13 and is fixed thereto by means of a suitable adhesive. Base ply 14 serves two functions: it catches portions A of the front ply 12 that pass through rear ply 13, and it reinforces the front and rear plies so that they will resist bending when the device 11 is held in the hand and punched. Base ply 14 includes a layer of corrugated paper 20 and a backing sheet 21 for the corrugated paper (see FIGS. 1 and 3). The manner in which the base ply 14 is affixed to the under surface of the inner ply 13 is best seen in FIG. 1. Base ply 14 contacts rear ply 13 only at the crests 22 of the corrugated paper 20. Consequently, the base ply 14 is adhesive bonded to rear ply 13 only at the crests of the corrugations 20. The troughs 23 of the corrugations 20 are not in contact with rear ply 13 and are bonded at their lowest surfaces to backing paper 21. In the illustrated preferred embodiment the corrugated base ply 14 is fixed to the rear ply 13 so that a series of troughs 23 are located under rows of cut portions 16 of rear ply 13 and removable portions A of front ply 12. With troughs 23, cut portions 16, and removable portions A in alignment, a removable portion A severed from the remainder of the front ply 12 by means of a punching instrument or the like can be forced through rear ply 13 and into the underlying trough 23. While the corrugations 20 have been illustrated in an embodiment in which their crests and troughs extend transversely of the device 11, their crests and troughs may extend longitudinally of the device for additional lengthwise support.

Figure 3:
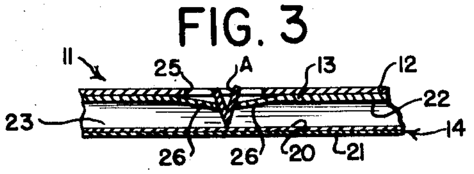
FIG. 3 is a vertical sectional view along the line 3—3 of FIG. 2 illustrating a removable front ply portion in partially punched position.

An example of a removable portion A disengaged from the remainder of front ply 12 and partially forced through an underlying cut portion 16 is illustrated in FIG. 3. It will there be seen that removal of portion A from front ply 12 has created an aperture 25 in that ply and has depressed fingers 26 formed by the H-shaped cut in the rear ply 13. As illustrated, removable portion A is grasped by the fingers 26 so that when the front ply 12 is subsequently removed for reading or storage, the removable portion A will remain engaged by the fingers 26 and will not be removed with front ply 12. Further downward force directed against the removable portion A in FIG. 3 will push that portion past the fingers 26 into the trough 23.

Other preferred, cut line configurations in a rear ply 13 have been illustrated in FIGS. 5 and 6. Force exerted downwardly against the two intersecting cut lines 28 and 29 of FIG. 5 will form 4 separate fingers to grasp and retain a removable portion A pushed between them. The horizontal cut lines 30 and interconnecting vertical cut line 31 of FIG. 6 form an "I," and two fingers similar to the fingers 26 formed from the H-shaped cut lines will result from a downward force directed against "I."

The asesmbly 10 of FIG. 1 shows the indicia bearing members 33, 34, 35, etc. fixed with relationship to each other and to the information recording device 11 by means of staples 37 located at one side of the assembly. It will be noted that the uppermost member of sheet 33 is of such length that it overlies all of the underlying members or sheets 34, 35, etc., in their entirety, but is not as long as the front ply 12 of the information recording device 11. Sheet 33 extends over front ply to a position in which column one alone of that ply is exposed. Thus, when answers to questions or responses to indicia carried by sheet 33 are to be indicated, one or more of the removable portions A of column 1 of front ply 12 can be punched out.

After the responses to the indicia on sheet 33 have been noted, sheet 33 is displaced manually so that the face of next successive underlying sheet 34 is revealed together with the indicia borne by same. The length of sheet 34 is less than that of sheet 33 by the distance between adpacent columns of the front ply 12 in order that column two will be exposed when the face of sheet 34 is exposed in its entiretly. After the responses to the indicia carried by sheet 34 have been noted by punching out portions A of column 2 of front ply 12, sheet 34 is withdrawn to expose sheet 35 and column three. This process continues until all the indicia bearing pages have been exposed and all the columns corresponding to the number of those pages have been utilized to record information thereon. Subsequent to the complete utilization of the front ply 12, that ply is torn from the remainder of the assembly 10 along the perforated line 38 shown in FIG. 2 and processed for reading or storage without the need of editing. The remainder of the assembly 10 may be discarded in its entirety, such discard effecting disposal of the removable portions A as well as the sheets 33, 34, etc., and the rear and base plies 13 and 14.

Thus, we have described a structure which, in a preferred embodiment, employs inexpensive plies of paper and paperboard economically combined and conveniently utilized. Because of the inexpensive materials from which the invention may be formed, all of the structure except the information-bearing front ply may be discarded after use. Furthermore, the entire structure is of such light weight that it may be sent through the mails at low cost. After the information has been recorded, the punched card may be returned through the mails. Because of the simplicity of the assembled structure, it is easy to handle and use; yet faithful perforation of the front ply of the information recording device is assured.

It will be apparent that modifications and alterations may be made in the preferred embodiment of the invention illustrated in FIGS. 1 to 6 of the drawing without departing from the scope of the present invention. For example, the plurality of sheets 33, 34, etc., may be used with an underlying ply having a face adapted to indicate information by means of writing rather than punching out portions of the ply. Likewise, the information recording device 11 may be utilized without the plurality of sheets 33, 34 etc., and still advantageously record information without the need for subsequent editing of the front ply 12. The scope of the present invention, therefore, is to include all such modifications and alterations within the purview of the invention, which is to be limited only by the scope of the following, appended claims.

What is claimed is:

1. A device for recording information, comprising a top ply having formed therein a plurality of portions each of which is individually removable by the application of force against its face, and a rear ply formed from a sheet of flexible material and disposed in back of said top ply with respect to the direction of application of said force, said rear ply including cut portions having the configuration of the letter "H" adjacent to said removable portions of said top ply to engage said removable portions as they are forced in the direction of said rear ply and hold said portions to prevent them from returning to their original positions on said top ply upon the release of said force, and a flexible resilient base ply located in back of and adjacent to said rear ply to retain ones of said removable portions forced from said top ply and through said cut portions of said rear ply.

2. A device for recording information, comprising a top ply having formed therein a plurality of portions each of which is individually removable by the application of force against its face, and a rear ply formed from a sheet of flexible material disposed adjacent to and in back of said top ply with respect to the direction of application of said force, said rear ply having formed therein cut portions having the configuration of the letter "H" in registration with said removable portions of said top ply to engage said removable portions as they are forced in the direction of said rear ply and hold said portions to prevent them from returning to their original positions on said top ply upon the release of said force, and a flexible resilient base ply located in back of and adjacent to said rear ply to retain ones of said removable portions forced from said top ply and through said cut portions of said rear ply.

3. A device for recording information, comprising a top ply having formed therein a plurality of portions each of which is individually removable by the application of force against its face, and a rear ply formed from a thin sheet of flexible material and disposed in back of said top ply with respect to the direction of application of said force, said rear ply including means adjacent to said removable portions of said top ply to engage said removable portions as they are forced in the direction of said rear ply and hold said portions to prevent them from returning to their original positions on said top ply upon the release of said force, said top ply and said rear ply being releasably joined at one end thereof so that said plies can be separated after information has been recorded on said top ply, and a flexible, resilient base ply located in back of and adjacent to said rear ply to retain ones of said removable portions forced from said front ply through said rear ply.

4. A device for recording information, comprising a top paperboard ply having formed therein a plurality of portions each of which is individually removable by the application of force against its face, and a rear ply disposed adjacent to and in back of said top ply with respect to the direction of application of force, said rear ply being formed from a sheet of flexible material and having cut portions in registration with said removable portions of said top ply, said cut portions forming flexible fingers which engage said removable portions as they are forced in the direction of said rear ply and hold said portions to prevent them from returning to their original positions on said top ply upon the release of said force and a flexible, resilient base ply located in back of and adjacent to said rear ply to retain individually removed portions of said top ply as they are forced through said rear ply.

5. A device for recording information, comprising a front ply having formed therein a plurality of portions each of which is individually removable by the application of force against its face, a rear ply formed from a single continuous thin sheet of flexible material disposed adjacent to and in back of said front ply with respect to the direction of application of said force, said rear ply having formed therein cut portions in registration with said removable portions of said front ply to engage said removable portions as they are forced in the direction of said rear ply and hold said removable portions to prevent them from returning to their original positions on said front ply upon the release of said force, and a flexible, resilient base ply located in back of and adjacent to said rear ply to retain ones of said removable portions forced from said front ply and through said cut portions of said rear ply, the base ply consisting of a corrugated member fixed to the bottom surface of said rear ply at the crests of the corrugation, the distance between corresponding points on adjacent corrugations being substantially equal to the distance between corresponding points on adjacent cut portions of the rear ply.

6. A device for recording information, comprising a front ply having formed therein a plurality of portions each of which is individually removable by the application of force against its face, a rear ply formed from a single continuous thin sheet of flexible material disposed adjacent to and in back of said front ply with respect to the direction of application of force, said rear ply having formed therein cut portions in registration with said removable portions of said front ply to engage said removable portions as they are forced in the direction of said rear ply and hold said portions to prevent them from returning to their original positions on said front ply upon the release of said force, and a flexible resilient base ply joined to said rear ply at spaced locations along the bottom surface thereof to retain ones of said removable portions forced from said front ply and through said cut portions of said rear ply, the base ply consisting of a corrugated member fixed to the bottom surface of said rear ply at the crests of the corrugation, the distance between corresponding points on adjacent corrugations being substantially equal to the distance between corresponding points on adjacent cut portions of the rear ply.

7. A device for recording information, comprising a front cardboard ply having formed therein a plurality of rows of portions each of which is individually removable by the application of force against its face, a rear ply formed from a single continuous sheet of card stock disposed adjacent to and in back of said front ply with respect to the direction of application of force, said rear ply having formed therein cut portions in registration with said removable portions of said front ply to engage said removable portions as they are forced in the direction of said rear ply and hold said portions to prevent them from returning to their original positions on said front ply upon the release of said force, and a flexible, resilient base ply composed of corrugated material in which the distance between corresponding points on adjacent corrugations is substantially equal to the distance between corresponding points on adjacent rows of said removable portions, said base ply being joined to the bottom surface of said rear ply at the crests of said corrugations so that removable portions forced from said front ply through said cut portions of said rear ply are retained in the troughs of said corrugations, the distance between corresponding points on adjacent corrugations being substantially to the distance to corresponding points of the cut portions of the rear ply.

8. A device for exposing successive sheets carrying visual indicia and for recording information produced in response to viewing said indicia, comprising a plurality of sheets carrying indicia on their faces, each of said sheets being arranged to overlie its next successive sheet and having a length greater than the length of said next successive sheet, a punch card adapted to have record information indicated thereon by punching out removable portions of said card, and means for holding said sheets in fixed relation to each other and to said card so that as the faces of successive ones of said sheets are exposed by displacement of their overlying sheets successive removable portions of said card are exposed.

9. A device as claimed in claim 8, said card being releasably held in fixed relation to said sheets so that said card can be easily separated from said sheets.

10. A device for exposing successive sheets carrying visual indicia and for recording information produced in response to viewing said indicia, comprising a plurality of sheets carrying indicia on their faces, each of said sheets being arranged to overlie its next successive sheet and having a length greater than the length of said next successive sheet, a punch card adapted to have record information indicated thereon by punching out removable portions of said card, means for releasably holding said sheets in fixed relation to each other and to said card so that as the faces of successive ones of said sheets are exposed by displacement of their overlying sheets, successive removable portions of said card are exposed, and a rear ply formed from a sheet of flexible material and disposed in back of said punch card with respect to said indicia-carrying sheets, said rear ply including means adjacent said removable portions of said punch card to engage said removable portions as they are forced in the direction of said rear ply and hold said portions to prevent them from returning to their original positions on said punch card upon release of the force.

11. A device as claimed in claim 10, in which said portion engaging means of said rear ply is in the form of cut portions of said ply in registration with said removable portions of said punch card, said cut portions forming flexible fingers which engage said removable portions as they are forced in the direction of said rear ply.

References Cited by the Examiner

UNITED STATES PATENTS

| | | | |
|---|---|---|---|
| 1,500,777 | 7/1924 | Stevenson | 35—48.1 |
| 2,876,907 | 3/1959 | Amberg | 283—42 |
| 3,015,424 | 1/1962 | Laframboise | 235—61.12 |

FOREIGN PATENTS

| | | |
|---|---|---|
| 846,212 | 8/1960 | Great Britain. |

ROBERT C. BAILEY, *Primary Examiner.*

WALTER W. BURNS, Jr., MALCOLM A. MORRISON, DARYL W. COOK, *Examiners.*